(12) United States Patent
Sargent et al.

(10) Patent No.: US 11,238,188 B2
(45) Date of Patent: Feb. 1, 2022

(54) GENERATING PERSONALIZED EXOSUIT DESIGNS

(71) Applicant: X Development LLC, Mountain View, CA (US)

(72) Inventors: Joseph Hollis Sargent, San Francisco, CA (US); Rhoda Jill Kentin, Oakland, CA (US)

(73) Assignee: X Development LLC, Mountain View, CA (US)

( * ) Notice: Subject to any disclaimer, the term of this patent is extended or adjusted under 35 U.S.C. 154(b) by 27 days.

(21) Appl. No.: 16/837,048

(22) Filed: Apr. 1, 2020

(65) Prior Publication Data

US 2021/0312097 A1   Oct. 7, 2021

(51) Int. Cl.

| | |
|---|---|
| *G06T 19/20* | (2011.01) |
| *G06T 17/00* | (2006.01) |
| *A41H 3/00* | (2006.01) |
| *G06F 30/10* | (2020.01) |
| *A41D 13/00* | (2006.01) |

(Continued)

(52) U.S. Cl.
CPC ......... *G06F 30/10* (2020.01); *A41D 13/0002* (2013.01); *A41H 3/007* (2013.01); *A41H 3/04* (2013.01); *G06T 17/00* (2013.01); *G06T 19/20* (2013.01); *G06F 2113/12* (2020.01); *G06T 2210/16* (2013.01)

(58) Field of Classification Search
None
See application file for complete search history.

(56) References Cited

U.S. PATENT DOCUMENTS

| | | |
|---|---|---|
| 6,725,124 B2 | 8/2004 | Yan |
| 6,907,310 B2 | 6/2005 | Gardber et al. |

(Continued)

FOREIGN PATENT DOCUMENTS

| | | |
|---|---|---|
| KR | 20170077898 | 7/2017 |
| WO | WO 2017/044093 | 3/2017 |

OTHER PUBLICATIONS

Andreas Frutiger, Capacitive Soft Strain Sensors via Multi-core-Shell Fiber Printing, Mar. 9, 2015, Advanced Materials, p. 2440. (Year: 2015).*

(Continued)

*Primary Examiner* — Joni Hsu
(74) *Attorney, Agent, or Firm* — Fish & Richardson P.C.

(57) ABSTRACT

Methods, systems, and apparatus, including computer programs encoded on a computer storage medium, for generating personalized exosuits. In some implementations, sensor data indicating a three-dimensional shape of stretchable template garment while the template garment is worn by a person and has been stretched to align with the person's anatomy is obtained. The template garment can include indicators corresponding to positions for components of an exosuit, and can correspond to an exosuit design. The sensor data is analyzed to determine locations of the indicators of the template garment. A personalized exosuit design is generated for the person by adjusting a computer model for the exosuit design to locate components of the exosuit at regions corresponding to the identified locations of the indicators of the template garment. The personalized exosuit design is provided to one or more manufacturing devices.

20 Claims, 6 Drawing Sheets

(51) Int. Cl.
    *A41H 3/04*     (2006.01)
    *G06F 113/12*     (2020.01)

(56) References Cited

U.S. PATENT DOCUMENTS

| | | | |
|---|---|---|---|
| 6,968,075 B1* | 11/2005 | Chang | G06K 9/00214 |
| | | | 382/111 |
| 7,678,147 B2 | 3/2010 | Clifford et al. | |
| 8,384,714 B2 | 2/2013 | De Aguiar et al. | |
| 8,838,263 B2 | 9/2014 | Sivak et al. | |
| 8,994,776 B2 | 3/2015 | Sutherland et al. | |
| 9,162,142 B2 | 10/2015 | Shum et al. | |
| 9,235,765 B2 | 1/2016 | Bentley et al. | |
| 9,265,647 B2 | 2/2016 | DeSousa | |
| 9,457,589 B2 | 10/2016 | Miller et al. | |
| 9,460,557 B1 | 10/2016 | Tran et al. | |
| 9,562,742 B2 | 2/2017 | Popovici | |
| 9,665,906 B2 | 5/2017 | Adeyoola et al. | |
| 9,737,239 B2 | 8/2017 | Kimmel | |
| 9,788,600 B2 | 10/2017 | Wawrousek et al. | |
| 9,792,479 B2 | 10/2017 | Mallet et al. | |
| 9,895,841 B2 | 2/2018 | Page | |
| 9,928,633 B2 | 3/2018 | Cotter et al. | |
| 10,067,500 B2 | 9/2018 | Hargovan et al. | |
| 10,390,973 B2 | 8/2019 | Tong et al. | |
| 10,555,792 B2 | 2/2020 | Kopelman et al. | |
| 2003/0120183 A1 | 6/2003 | Simmons | |
| 2014/0007016 A1 | 1/2014 | Li | |
| 2015/0173993 A1* | 6/2015 | Walsh | A61F 2/68 |
| | | | 414/4 |
| 2016/0107309 A1 | 4/2016 | Walsh et al. | |
| 2016/0088284 A1 | 5/2016 | Sareen et al. | |
| 2016/0128890 A1 | 5/2016 | LaChappelle et al. | |
| 2016/0247017 A1 | 8/2016 | Sareen et al. | |
| 2016/0349738 A1 | 12/2016 | Sisk | |
| 2017/0202724 A1 | 7/2017 | Rossi et al. | |
| 2017/0231794 A1 | 8/2017 | Church | |
| 2017/0245570 A1* | 8/2017 | Yuen | A42C 3/06 |
| 2017/0287212 A1 | 10/2017 | Tran et al. | |
| 2018/0056104 A1* | 3/2018 | Cromie | A63B 21/4039 |
| 2018/0243155 A1 | 8/2018 | Angold et al. | |
| 2019/0035149 A1 | 1/2019 | Chen et al. | |
| 2019/0299522 A1 | 10/2019 | Chapiro et al. | |
| 2019/0328604 A1 | 10/2019 | Contreras-Vidal et al. | |
| 2019/0380904 A1 | 12/2019 | Panizzolo et al. | |
| 2020/0082138 A1 | 3/2020 | Newman | |
| 2020/0178632 A1* | 6/2020 | Agarwal | A41H 3/007 |
| 2021/0022943 A1* | 1/2021 | Tsou | A61H 1/0237 |

OTHER PUBLICATIONS

Shaik Murbarak Basha; Design, Fabrication & Analysis of Exoskeleton on Aluminum Alloy 2082 (T6); Aug. 2018; International Research Journal of Engineering and Technology; vol. 5, Issue 8; p. 1665. (Year: 2018).*
Ashley, "Robotic Exoskeletons Are Changing Lives in Surprising Ways," Feb. 21, 2017, retrieved on Mar. 31, 2020, retrieved from URL <https://www.nbcnews.com/mach/innovation/robotic-exoskeletons-are-changing-lives-surprising-ways-n722676>, 4 pages.
Avanti.care [online], "Powered clothing & exo-skeletons: Technology in care," May 15, 2019, retrieved from URL <https://avanti.care/powered-clothing-exo-skeletons/>, 4 pages.
biodesign.seas.harvard.edu [online], "Soft Exosuits," Jan. 27, 2017, retrieved on Mar. 31, 2020, retrieved from URL <https://biodesign.seas.harvard.edu/soft-exosuits>, 3 pages.
Dormehl, "This sleek new exoskeleton makes walking easier, fits under your clothes," Mar. 25, 2019, retrieved from URL <https://www.digitaltrends.com/cool-tech/vanderbilt-ankle-exoskeleton/>, 6 pages.
Dorrier, "Robotic Exoskeletons, Like This One, Are Getting More Practical," Dec. 18, 2019, retrieved on Mar. 31, 2020, retrieved from URL <https://singularityhub.com/2019/12/18/robotic-exoskeletons-like-this-one-are-getting-more-practical/>, 2 pages.

Exoskeletonreport.com [online], "Seismic Powered Clothing—A Consumer Wellness Experience," Jan. 17, 2019, retrieved from URL <https://exoskeletonreport.com/2019/01/seismic-powered-clothing-a-consumer-wellness-experience/>, 4 pages.
fit3d.com [online], "Use your Body Scans to Buy Better Fitting Clothes," Nov. 9, 2018, retrieved on Mar. 31, 2020, retrieved from URL <https://fit3d.com/blog/personalized-clothing>, 2 pages.
Lacy, "Amazon Might Use 3D Body Scans to Customize Clothes—and Also Capture Your Data," Jul. 21, 2019, retrieved from URL <https://www.adweek.com/retail/amazon-might-use-3d-body-scans-to-customizeclothes-and-also-capture-your-data/>, 2 pages (Excerpt only).
Lee, "3D body scanner promises perfectly fitting clothes," Oct. 3, 2019, retrieved on Mar. 31, 2020, retrieved from URL <https://www.engadget.com/2019-10-03-virtual-try-on-scanatic-fashion.html>, 10 pages.
Marinov, "SRI Robotics Super Flex Exosuit," Apr. 13, 2016, retrieved on Mar. 31, 2020, retrieved from URL <https://exoskeletonreport.com/2016/04/sri-robotics-super-flex-exosuit/>, 4 pages.
Morby, "Yves Béhar's Aura Power Clothing helps the elderly with mobility," Jan. 12, 2017, retrieved from URL <https://www.dezeen.com/2017/01/12/yves-behar-aura-power-clothing-helps-elderly-mobility-design-museum-london/>, 16 pages.
myseismic.com [online], "A fusion of apparel and robotics," Sep. 8, 2018, retrieved from URL <https://www.myseismic.com/>, 9 pages.
Pardes, "The Perfect Pair of Pants Is Just a 3D Body Scan Away," Feb. 28, 2019, retrieved on Mar. 31, 2020, retrieved from URL <https://www.wired.com/story/bespoke-clothing-3d-body-scans/>, 5 pages.
rewalk.com [online], "About Products," Apr. 28, 2019, retrieved on Mar. 31, 2020, retrieved from URL <https://rewalk.com/about-products-2/>, 8 pages.
rewalk.com [online], "The ReStore Soft Exo-Suit," Dec. 20, 2019, retrieved from URL <https://rewalk.com/restore-exo-suit/>, 5 pages.
TechCrunch [online], "Electronic Apparel debuts a new line of powered clothing at Disrupt SF 2018," Sep. 17, 2018, retrieved on Mar. 31, 2020, retrieved from URL <https://www.youtube.com/watch?v=9_CTXRND3sU>, 1 page [Video Submission].
wikipedia.org [online], "Powered exoskeleton," retrieved from URL <https://en.wikipedia.org/wiki/Powered_exoskeleton>, Mar. 2020, 12 pages.
wyss.harvard.edu [online], "Soft Exosuits for Lower Extremity Mobility," Nov. 7, 2019, retrieved on Mar. 31, 2020, retrieved from URL <https://wyss.harvard.edu/technology/soft-exosuits-for-lower-extremity-mobility/>, 5 pages.
All2dp.com [online], "2020 Best Free 3D Printing Software," Mar. 25, 2020, retrieved on May 14, 2020, retrieved from URL<https://all3dp.com/l/best-free-3d-printing-software-3d-printer-program/>, 41 pages.
All2dp.com [online], "3D Printed Cloths: Myth or Reality?," Jun. 27, 2019, retrieved on May 14, 2020, retrieved from URL<https://all3dp.com/2/3d-printed-cloths-myth-or-reality/, 9 pages.
Cyberdyne.jp [online] "HAL for Living Support Single Joint Type," 2020, retrieved on Oct. 26, 2020, retrieved from URL <https://www.cyberdyne.jp/english/products/SingleJoint.html>, 6 pages.
Dummies.com [online], "How to Scan Objects for 3D Printing," retrieved on May 14, 2020, retrieved from URL<https://www.dummies.com/computers/pcs/printers/how-to-design-in-the-computer-for-3d-printing//>, 6 pages.
Lee et al., "Biomechanical Design of a Novel Flexible Exoskeleton for Lower Extremities," IEEE/ASME Transactions on Mechatronics, Oct. 2017, 22(5):2058-2069.
Moon et al., "Development of a Single Leg Knee Exoskeleton and Sensing Knee Center of Rotation Change for Intention Detection," Sensors, 2019, 19(3960):19 pages, Sep. 13, 2019.
Park et al., "A Soft Wearable Robotic Device for Active Knee Motions using Flat Pneumatic Artificial Muscles," 2014 IEEE International Conference on Robotics & Automation, May 31-Jun. 7, 2014, 6 pages.
Sridar et al., "A Soft-Inflatable Exosuit for Knee Rehabilitation: Assisting Swing Phase During Walking," Frontiers in Robotics and AI, May 2018, 5(44):9 pages.

(56) References Cited

OTHER PUBLICATIONS

Visionline [online], "Automated 3D Model Creation," retrieved on May 14, 2020, retrieved from URL<https://www.visiononline.org/company-profile-detail.cfm/machinevision/photoneo/company_id/1005, 4 pages.

* cited by examiner

GENERATING PERSONALIZED EXOSUIT DESIGNS

FIELD

This disclosure generally relates to exosuits.

BACKGROUND

Exosuits can provide mechanical benefits to those that wear them. These benefits can include increased stability and improved strength.

SUMMARY

A computer-implemented system can generate personalized exosuit models. In generating a personalized exosuit model, the system can receive scan data from a three-dimensional (3D) scanner used to scan a person wearing a stretchable template garment. The stretchable template garment includes a number of indicators corresponding to positions for components for an exosuit. The system can access a data model corresponding to the stretchable template garment, such as a default computer model. The system can modify the data model to personalize it for the person using the scan data.

In some implementations, after the person puts on the stretchable template garment, the stretchable template garment is aligned with the person's anatomy. A different person can help to align the template garment with the person's anatomy. The person can align the template garment themselves with their anatomy. Aligning the template garment with the person's anatomy can include aligning one or more indicators of the stretchable template garment with one or more anatomical structures of the person, resulting in, for example, a personalized position of the one or more indicators. The size and/or shape of the one or more of the indicators can change size and/or shape from when the template garment is unworn to when the template garment is worn and aligned with the person's anatomy, resulting in, for example, a personalized size and/or shape of the one or more indicators. The personalized position, shape, and/or size of the one or more of the indicators can be captured in the scan of the person wearing the stretchable template garment by the 3D scanner. The system can use the changes to the position, size, and/or shape of the one or more indicators to modify the data model, resulting in, for example, a personalized data model.

In some implementations, the personalized data model is sent to an external device. The external device can be, for example, a 3D printer used to print one or more components represented in the personalized data model. The printed components can be used to assemble a personalized exosuit for the person.

In some implementations, in generating the personalized exosuit model, the system uses one or more algorithms, such as one or more machine learning algorithms. The system can use these one or more algorithms to, for example, identify a type of template garment that the person is wearing based on the scan data, to identify a size of template garment that the person is wearing based on the scan data, to adjust a size of one or more components based on the scan data, and/or to adjust a number of components based on the scan data.

In some implementations, in generating the personalized exosuit model, the system considers one or more characteristics of the user. For example, the system can adjust the size of one or more components, and/or a number of components based on a height of the person, a weight of the person, activities the person intends to perform, and/or health conditions of the person including injuries the person has sustained, surgeries the person has undergone, diseases that the person suffers from, and/or disorders that the person suffers from (e.g., Parkinson's, ALS, cerebral palsy, etc.). These characteristics can be determined by the system based on the scan data, provided to the system, or a combination of determined by the system and provided to the system.

In some implementations, the system selects the accessed data model based on the received scan data. The system can analyze the scan data to determine, for example, the type of template garment the person is wearing and/or a size of garment the person is wearing. The system can select a default data model that corresponds to the determined type and/or size of the template garment.

In one general aspect, a method includes: obtaining, by the one or more computers, sensor data indicating a three-dimensional shape of stretchable template garment while the template garment is worn by a person and has been stretched to align with the person's anatomy, where the template garment includes indicators corresponding to positions for exosuit components and the template garment corresponds to an exosuit design; analyzing, by the one or more computers, the sensor data to determine locations of the indicators of the template garment; generating, by the one or more computers, a personalized exosuit design for the person by adjusting a data model for the exosuit design to locate exosuit components at regions corresponding to the determined locations of the indicators of the template garment; and providing, by the one or more computers, the personalized exosuit design to a device.

Implementations may include one or more of the following features. For example, in some implementations, the data model is a data model representing a reference design for an exosuit.

In some implementations, the data model is a computer-aided design model that specifies positional relationships of exosuit components in three dimensions.

In some implementations, the indicators are visible at an outer surface of the template garment.

In some implementations, obtaining the sensor data includes obtaining sensor data for multiple different poses of the person while the template garment is worn by the person.

In some implementations, the method includes using the sensor data for the multiple different poses to determine at least one of: anatomical properties of the person; positions of exosuit components of the personalized exosuit design; or functional capabilities for the personalized exosuit design.

In some implementations, the functional capabilities include at least one of a range of motion for the personalized exosuit design, a joint center of motion for the personalized exosuit design, a level of assistance for the personalized exosuit design to provide, a level of stability for the personalized exosuit design to provide, or a set of functionality configured to assist with a particular health condition.

In some implementations, analyzing the sensor data includes analyzing the sensor data to determine at least one of a size, shape, number, type, or orientation of the indicators of the template garment.

In some implementations, analyzing the sensor data includes analyzing the sensor data to determine, for one or more of the indicators, at least one of: a length of the indicator, a change in length of the indicator with respect to a length of the indicator when the template garment is not worn by the person, a width of the indicator, a change in width of the indicator with respect to a width of the indicator when the template garment is not worn by the person, an angle of the indicator with respect to one or more of the other indicators, a position of the indicator with respect to one or more of the other indicators, a change in angle of the indicator with respect to an angle of the indicator when the template garment is not worn by the person, a distance of the indicator from one or more of the other indicators, or a change in distance of the indicator from one or more of the other indicators with respect to a distance of the indicator from the one or more of the other indicators when the template garment is not worn by the person.

In some implementations, generating the personalized exosuit design includes adjusting at least one of a size, shape, number, type, location, or orientation of one or more exosuit components.

In some implementations, providing the personalized exosuit design to the device includes providing the personalized exosuit design to a manufacturing device.

In some implementations, providing the personalized exosuit design to a manufacturing device includes providing the personalized exosuit design to a 3D printer.

In some implementations, providing the personalized exosuit design to a manufacturing device includes providing the personalized exosuit design to a computer numerical control (CNC) machine.

In some implementations, the method includes receiving input indicating modifications to at least one of a size, shape, number, type, location, or orientation of the components of the exosuit, where generating a personalized exosuit design includes adjusting the data model for the exosuit design or the personalized exosuit design in accord with the modifications.

In some implementations, obtaining sensor data includes obtaining scan data from a 3D scanner.

In some implementations, obtaining scan data from the 3D scanner includes obtaining scan data from one of the following: a photogrammetry scanner; a LiDAR scanner; or a structured light scanner.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A computer-implemented system can generate personalized exosuit models. In generating a personalized exosuit model, the system can receive scan data from a three-dimensional (3D) scanner used to scan a person wearing a stretchable template garment. The stretchable template garment includes a number of indicators corresponding to positions for components for an exosuit. The system can access a data model corresponding to the stretchable template garment, such as a default computer model. The system can modify the data model to personalize it for the person using the scan data.

After the person puts on the stretchable template garment, the stretchable template garment is aligned with the person's anatomy. A different person can help to align the template garment with the person's anatomy. The person can align the template garment themselves with their anatomy. Aligning the template garment with the person's anatomy can include aligning one or more indicators of the stretchable template garment with one or more anatomical structures of the person, resulting in, for example, a personalized position of the one or more indicators. The size and/or shape of the one or more of the indicators can change size and/or shape from when the template garment is unworn to when the template garment is worn and aligned with the person's anatomy, resulting in, for example, a personalized size and/or shape of the one or more indicators. The personalized position, shape, and/or size of the one or more of the indicators can be captured in the scan of the person wearing the stretchable template garment by the 3D scanner. The system can use the changes to the position, size, and/or shape of the one or more indicators to modify the data model, resulting in, for example, a personalized data model.

Figure 1:
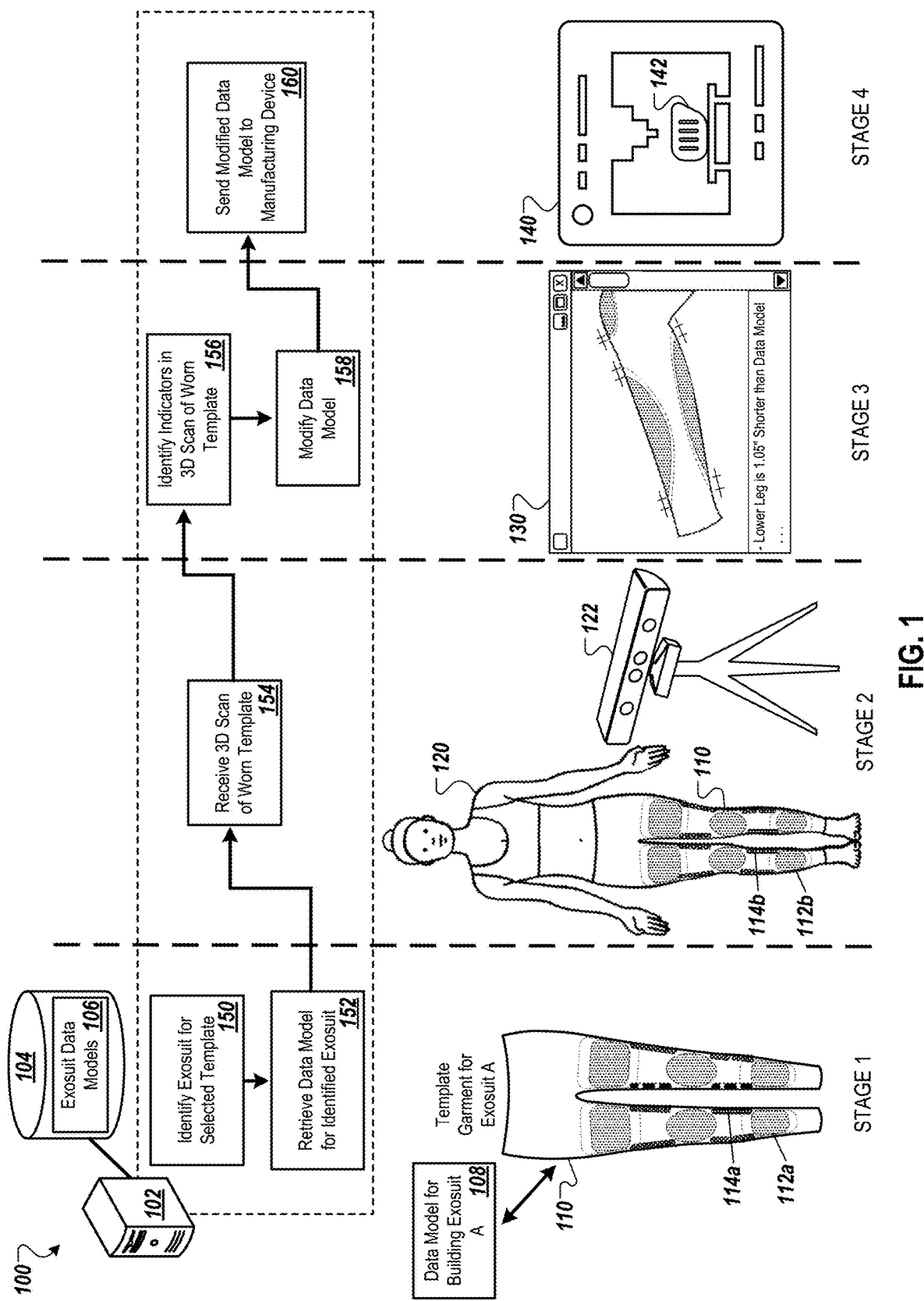
FIG. 1 is a diagram that illustrate an example system and process for generating personalized exosuits.

FIG. 1 is a diagram that illustrate an example system 100 and process for generating personalized exosuits. The process includes four stages: Stage 1, Stage 2, Stage 3, and Stage 4. In stage 1, a stretchable template garment having indicators is selected, and a data model corresponding to the template garment is obtained. In stage 2, a person wearing the template garment is scanned. In stage 3, the scan data is used to detect indicators, and the detected indicators are used to personalize the data model for the person. In stage 4, the personalized data model is sent to a device. Stages 1-4 may occur in the illustrated sequence, or in a sequence that is different from the illustrated sequence. For example, some of the stages may occur concurrently.

The system 100 includes a management system 102. The system 100 can also include one or more other devices, such as a 3D scanner 122 and a 3D printer 140. The system 100 can generate a personalized exosuit computer model. The system 100 can also generate a personalized exosuit based on the personalized exosuit computer model.

The 3D scanner 122 can be a photogrammetry scanner, e.g., a scanner having one or more cameras (e.g., stereo cameras having a fixed offset) that it uses to perform photogrammetry. For example, the 3D scanner 122 can be a smart phone having one or more digital cameras. The smart phone can be used to produce 3D scan data using, for example, structure from motion techniques, e.g., by a user capturing multiple images of an object (e.g., a template garment) from various positions and/or angles using a digital camera of the smart phone. The 3D scanner 122 can be a LiDAR scanner, e.g., a scanner using one or more time-of-flight sensors and/or phase-shift techniques. The 3D scanner 122 can be a structured light scanner. The 3D scanner 122 can collect 3D data and color data. The 3D scanner 122 can collect image data, such as, for example, multiple overlapping digital photographs. The 3D scanner 122 can output, for example, RGB+D, BW+D, point cloud, a 3D model, and/or 3D model specifications that can be used by the management system 102 to generate a 3D model.

The management system 102 includes data storage 104 storing one or more exosuit data models 106. The management system 102 can include one or more computing devices. The management system 102 can communicate with one or more other devices, such as a 3D scanner 122, a 3D printer 140, and/or one or more other computing devices. These other computing devices can include, for example, an administrator device such as a desktop computer, a laptop computer, a mobile phone, a smart phone, a personal digital assistants (PDA), a tablet computer, or other computing devices. These other computing devices can include, for example, a user device belonging to a user 120 such as a desktop computer, a laptop computer, a mobile phone, a smart phone, a personal digital assistant (PDA), a tablet computer, or other computing devices. The management system 102 can communicate with these one or more other devices over a network. The network can include public and/or private networks and can include the Internet. The management system 102 can communicate with these one or more other devices over a wired connection.

In some implementations, the management system 102 is part of a cloud computing platform (e.g., Amazon Web Services (AWS), Microsoft Azure, and so on).

The techniques disclosed in this document can improve the effectiveness exosuits. Improving the effectiveness of exosuits can include, for example, improving the fit of exosuits to provide the wearer better support and increased comfort, improving the placement of components of exosuits to provide the wearer better support and increased comfort, improving the design of the exosuit by increasing a number of component and/or size/shape/thickness of components to provide the wearer better support in the areas where they need support, and/or improving the design of the exosuit by reducing a number of components and/or size/shape/thickness of components to reduce the size/weight of the exosuit and, thereby, improve the comfort to the wearer. For example, the described system can be used to generate an exosuit that is personalized to a particular person such that it more accurately fits the anatomy of the person. Specifically, scan data collected from a 3D scan of the person wearing a template garment can be used by the system to adjust the placement, size, and/or shape of components of an exosuit, resulting in a personalized exosuit with an improved fit. The improved fit of the personalized exosuit can improve the effectiveness of the exosuit, reduce the likelihood of the person experiencing injury while wearing the exosuit, and/or improve comfort of the person while wearing the exosuit.

The techniques disclosed can also be used to improve exosuits in other ways. For example, the described system can be used to customize an exosuit based on characteristics of a particular person and/or an intended use of the exosuit. Specifically, an exosuit can be customized to increase or decrease a number of components of the exosuit, a size of one or more components of the exosuit based on a weight of the person, height of the person, age of the person, health conditions of the person, and/or intended use of the exosuit (e.g., light duty requirements, medium duty requirements, or heavy duty requirements). Customizing the generated exosuit can improve the effectiveness of the exosuit, reduce the likelihood of the person experiencing injury while wearing the exosuit, and/or improve comfort of the person while wearing the exosuit.

The techniques disclosed can provide process advantages during the design and/or creation of personalized exosuits. For example, the described system can customize an existing data model, e.g., a default data model, for each person requesting a personalized exosuit. By customizing the existing data model, the described system removes the need to create a data model for each person, e.g., a data model from scratch. That is, the described system is much more efficient than custom designing a new data model and/or exosuit. Accordingly, the process advantages of the described system can include improved personalized exosuit design efficiency, e.g., by reducing the time needed for personalized exosuit development and/or by reducing the resources required for personalized exosuit development.

In general a component can refer to any part of an exosuit. As an example, exosuit components can include anatomy support components (support components) and connector components. Support components can, when compared to connector components, be designed to contact a relatively large surface area of a person's body. As will be described in more detail below, support components can be designed so that they are contoured to a portion of a person's body, such as to particular anatomical structures of the person. Support components can include, for example, plates, cups, straps, etc. Support components can be made out of plastics, composites such as carbon fiber, metal, metal alloys, etc. Connector components can be designed and used to form connections between other components, including support components and/or other connector components. As will be described in more detail below, connector components can be designed so that they are contoured to a portion of a person's body. Connector components can be used, for example, to form hinges, as support bars or beams, or to provide force. As an example, connector components can include pneumatic or hydraulic artificial muscles that provide a contractile and/or extensional force when triggered.

As shown in FIG. 1, in stage 1, a stretchable template garment 110 is selected. The template garment 110 can correspond to a particular exosuit to be generated. For example, as shown, the template garment 110 corresponds to an exosuit "A", a lower body exosuit. The template garment 110 includes a number of indicators. These indicators include indicators for exosuit components such as a support indicator 112a and a connector indicator 114a. The indicators can be formed in the template garment 110, e.g., as a patch that is woven or sewn into the template garment 110, and/or as a differently colored or shaded area of the template garment (e.g., area that is formed out of a different dyed fabric, area that is formed out of a different type of fabric, etc.). The indicators can be added to the template garment 110. For example, the indicators can be sewn on the template garment 110, the indicators can be screen printed on the template garment 110, etc.

As will be described in more detail in FIG. 2, the template garment 110 can be selected from a number of template garments. The template garments can correspond to different types or designs of exosuits, e.g., a lower body exosuit, a single leg exosuit, a hip/back exosuit, an upper body exosuit, a single arm exosuit, or the like. The template garments can have varying sizes, e.g., large, medium, small, or the like. As shown, the template garment 110 corresponds to a lower body exosuit. The template garment 110 can be selected based on the user 120 requiring a lower body exosuit. The template garment 110 can have a particular size, e.g., a small size. The template garment 110 can additionally or alternatively be selected based on a required size for the user 120, e.g., based on a height and/or weight of the user 120. The management system 102 can automatically select the template garment 110 based on data of the user 120. For example, the management system 102 can automatically select the template garment 110 based on data indicating characteristics of the user 120 and a required exosuit type for the user 120, e.g., a lower body exosuit. This management system 102 can receive this data from an administrator device and/or from a user device. The management system 102 can store this data in the data storage 104.

The template garment 110 can be made out of a stretchable fabric or other material. For example, the template garment 110 can be made out of spandex, spandex blends, nylon spandex, polyester, neoprene, latex, or the like. The template garment 110 can be made out of multiple, different materials.

The management system 102 identifies the exosuit for the selected template garment (150). The management system 102 can identify the exosuit based on the template garment 110, based on a selected exosuit design or type of exosuit, based on a selected size of exosuit, and/or based on stored data for the user 120. For example, the management system 102 can identify a lower body exosuit A based on receiving an indication that the template garment 110 was selected for the user 120, based on receiving an indication that the user 120 requires a lower body exosuit, based on receiving an indication that the user 120 requires a small sized exosuit, and/or based on stored data for the user 120 that indicates that the user 120 requires a lower body exosuit or a small sized lower body exosuit. The management system 102 can receive these one or more indications from an administrator device and/or a user device of the user 120.

In identifying an exosuit for the template garment 110, the management system 102 can refer to a lookup table, e.g., a lookup up table associating template garments with exosuits. The lookup table can be stored in the data storage 104.

The management system 102 retrieves a data model 108 for the identified exosuit (152). A data model can be, for example, a computer design model, such as a CAD model. The computer design model can represent a reference design for an exosuit or for a type of exosuit. A data model can include, for example, 3D representations of exosuit components, such as support components and/or connector components. A data model can be or include, for example, a wire-frame model of an entire exosuit, or a wire-frame model for one or more components of an exosuit. A data model can be or include, for example, a surface model of an exosuit, or a surface model for one or more components of an exosuit. A data model can be generated using a set of specifications, such as specifications that identify components of an exosuit and/or provide positional relationships of components of an exosuit in three dimensions, such as positional relationships of support components and connector components in three dimensions. The data model 108 can be one of the exosuit data models 106 stored in the data storage 104. The data model 108 can be a default data model for the type of exosuit, e.g., exosuit design, corresponding to the template garment 110, and/or for a particular exosuit corresponding to the size of the template garment 110. For example, the data model 108 can be a default data model for a lower body exosuit. As another example, the data model 108 can be a default data model for a small sized lower body exosuit.

In retrieving the data model 108 for the identified exosuit, the management system 102 can refer to a lookup table, e.g., a lookup up table associating types and/or sizes of exosuit with the exosuit data models 106, to identify the data model 108. The lookup table can be stored in the data storage 104.

As will be discussed in more detail with FIG. 2, a type of exosuit can refer to an exosuit design, and/or a level of functionality of the exosuit. An exosuit design can correspond to anatomical structures/portions of a person's body that the exosuit is meant to support, such as lower body, upper body, right leg, left leg, right arm, left arm, back, back and hip, or the like. A level of functionality of an exosuit can correspond to the level of assistance/support the exosuit is meant to provide (e.g., specifying a type and/or magnitude of assistance, such as high, medium, or low support), to the level of stability the exosuit is meant to provide (e.g., high, medium, or low stabilization), one or more ranges of motion of the exosuit, and/or one or more joint centers of motion for the exosuit.

Exosuits may need different functionalities based on different conditions of the wearer, such as health conditions of the wearer (e.g., Parkinson's, ALS, paraplegic, etc.). Health conditions can include, for example, specific injuries, diseases, or disorders that the wearer suffers from. An exosuit can be designed to provide a predetermined set of functions needed for the condition of the wearer, such as to provide additional support, additional stability, different support, or different stability at predetermined areas or locations. These predetermined set of functions can be accomplished by, for example, increasing the number of components, increasing the size or strength of components (e.g., using a stronger material to manufacture the components), changing a support component design for the exosuit, and/or changing a connector component design for the exosuit. For example, if the wearer suffers from cerebral palsy, a type of exosuit can refer to a specific lower body exosuit that is designed to provide a high level of assistance, a high level of stability, and has a component structure for those suffering from cerebral palsy with an increased number of connector components in a different arrangement (e.g., different from a standard or default arrangement).

Exosuits can be assistive to the wearer. For example, exosuits can provide powered movement that compliments or supplements the use of the wearer's own muscle(s). Exosuits can include motors, pneumatic actuators, or other actuators. An exosuit can be, for example, a powered exoskeleton, a hydraulic exoskeleton, a pneumatic exoskeleton, or mechanized clothing.

In some implementations, the data model 108 is not a default data model. For example, the data model 108 can be a data model that was previously personalized for the user 120 or that was previously personalized for a user having similar characteristics to the user 120, e.g., a similar height, weight, age, or the like. Specifically, the user 120 may request a new exosuit after a given period of time, e.g., every six months, every year, every two years, or the like, to account for changes to the user 120's body. The data model 108 retrieved by the management system 102 can be the last data model personalized and/or customized for the user 120.

In some implementations, the management system 102 identifies the exosuit A and/or retrieves the data model 108 based on scan data it receives from the 3D scanner 122. For example, the management system 102 can identify the template garment 110 from the scan data, and determine a corresponding type and/or size of exosuit. The management system 102 can then proceed to retrieve the data model 108.

In some implementations, the template garment 110 only includes indicators for exosuit support components. As will be discussed in more detail below, the management system 102 can automatically adjust the number, size, and/or shape of connector components in the data model 108 based on a determined size and/or shape of the support indicators.

In some implementations, the template garment 110 only includes indicators for exosuit connector components. As will be discussed in more detail below, the management system 102 can automatically adjust the number, size, and/or shape of support components in the data model 108 based on a determined size and/or shape of the connector indicators.

As shown in FIG. 1, in stage 2, the user 120 puts on the template garment 110, the template garment 110 is aligned with the user 120's anatomy, and the 3D scanner 122 is used to scan the user 120 wearing the aligned template garment 110. After the user 120 puts on the stretchable template garment 110, the template garment 110 is aligned with the user 120's anatomy. A different person, such as a facility assistant, can help to align the template garment 110 with the user 120's anatomy. The user 120 can align the template garment 110 garment themselves with their anatomy. Aligning the template garment 110 with the user 120's anatomy can include aligning the indicators, including the indicators 112*a* and 114*a*, with anatomical structures of the user 120, resulting in, for example, a personalized position of the one or more indicators. The anatomical structures can include, for example, muscles, bones, joints, or combinations thereof. For example, the indicator 112*a* can be aligned with the right shin of the user 120.

The size and/or shape of the indicators can change size and/or shape from when the template garment 110 is unworn to when the template garment 110 is worn and aligned with the user 120's anatomy, resulting in, for example, a personalized size and/or shape of the one or more indicators. The personalized position, shape, and/or size of the indicators, including the indicators 112*b* and 114*b*, can be captured in the scan of the user 120 wearing the stretchable template garment 110 by the 3D scanner 122. As will be described in more detail below, the management system 102 can use the changes to the position, size, and/or shape of the indicators to modify the data model 108, resulting in, for example, a personalized data model.

When the stretchable template garment 110 is worn by the user 120, one or more indicators corresponding to components of an exosuit can change size and/or shape. For example, as shown, the size and/or shape of the support indicator 112*b* has changed when compared to its size and/or shape when the template garment 110 was not being worn. Specifically, the shape of the support indicator 112*b* has changed and its size has been reduced. Similarly, as shown, the size and/or shape of the connector indicator 114*b* has changed when compared to its size and/or shape when the template garment 110 was not being worn. Specifically, the connector indicator 114*b* has been reduced in size. This indicates, for example, that the anatomy of the user 120 requires exosuit components that are smaller than a default size.

The management system 102 receives a 3D scan of the template garment 110 (154). Specifically, the management system 102 can receive 3D scan data produced by the 3D scanner 122 from the 3D scanner 122. The 3D scan data can include multiple images of the user 120 wearing the template garment 110.

The changes to the position, size, and/or shape of the indicators of the template garment 110 can be captured during the scan of the user 120 wearing the template garment 110 by the 3D scanner 122. For example, the scan data can indicate a position, shape, and size of the support indicators including the indicator 112*b*. Similarly, the scan data can indicate a position, size, and shape of the connector indicators including the connector indicator 114*b*.

As shown in FIG. 1, in stage 3, the management system 102 identifies the indicators in the 3D scan of the template garment 110 being worn by the user 120 (156). In identifying the indicators, the management system 102 can use image recognition on the images in the 3D scan data to determine a size and/or shape of the indicators. As an example, the support indicators, including the indicator 112*b*, can have a first color, shade, and/or pattern. The connector indicators, including the indicator 114*b*, can have a second color, shade, and/or pattern that is different than the first color, shade, and/or pattern. The second color, shade, and/or pattern can be selected so as to contrast with the first color, shade, and/or pattern. The first color, shade, and/or pattern and the second color, shade, and/or pattern can be different from a base color, shade, and/or pattern of the template garment 110. The first color, shade, and/or pattern and the second color, shade, and/or pattern can be selected so as to contrast with the base color, shade, and/or pattern of the template garment 110. The management system 102 can use the first color, shade, and/or pattern and the second color, shade, and/or pattern of the indicators to, for example, identify the indicators in the 3D scan data, identify those indicators that are support indicators, and/or identify those indicators that are connector indicators. In identifying the indicators in the 3D scan data, the management system 102 can detect a size and/or shape of each of the indicators.

The management system 102 can also use the 3D scan data to determine characteristics of the user 120. For example, the management system 102 can use the 3D scan data to determine a height of the user 120, a right leg length for the user 120, a left leg length for the user 120, a right lower-leg length for the user 120, a left lower-leg length for the user 120, a right upper-leg length for the user 120, a left upper-leg length for the user 120, an estimated body fat percentage for the user, or the like. The management system 102 can store the determined characteristics of the user 120 in the data storage 104.

The management system 102 can also retrieve or receive characteristics of the user 120. These characteristics can include a height of the user 120, a weight of the user 120, injuries that the user 120 has sustained, surgeries that the user 120 has undergone, diseases that the user 120 suffers from, disorders that the user 120 suffers from (e.g., cerebral palsy), and/or activities that the user 120 intends to perform.

The management system 102 can modify the data model 108 (158). The management system 102 can modify the data model 108 using the identified indicators. For example, the management system 102 can modify the data model 108 based on a detected size and/or shape of the indicators. Specifically, the management system 102 can adjust a default size of one or more support components and/or connector components of the data model 108 using the detected sizes and/or shapes of the indicators. The management system 102 can additionally modify the data model 108 using characteristics for the user 120. For example, the management system 102 can take into account a determined left leg and right leg length of the user 120 when modifying the data model 108.

In modifying the data model 108, the management system 102 can adjust the size of one or more support components in the data model 108, the shape of one or more support components in the data model 108, the size of one or more connector components in the data model 108, the shape of one or more connector components in the data model 108, the number of support components in the data model 108, and/or the number of connector components in the data model 108.

In modifying the data model 108, the management system 102 can use one or more algorithms, such as one or more machine learning algorithms. The management system 102 can use these one or more algorithms to, for example, identify a type of template garment that the user 120 is wearing based on the 3D scan data, to identify a size of template garment that the user 120 is wearing based on the 3D scan data, to adjust a size of one or more support components in the data model 108 based on the 3D scan data, to adjust a size of one or more connector components in the data model 108 based on the 3D scan data, to adjust a number of support components in the data model 108 based on the 3D scan data, and/or adjust a number of connector components in the data model 108 based on the 3D scan data. The one or more machine learning algorithms can receive the 3D scan data as input. The one or more machine learning algorithms can also receive characteristics of the user 120 as input.

The adjustments made by the one or more algorithms to the components of the data model 108 can be refinements on the detected size and/or shapes of the indicators. For example, the management system 102 can adjust a size and/or shape of a component of the data model 108 using the one or more algorithms based on the 3D scan data and/or the characteristics of the user 120. The resulting component size and/or shape can have a different size and/or shape than the detected size and/or shape of the corresponding component indicator. That is, the one or more algorithms can adjust the size and/or shape of the component to account for other factors, e.g., to account for particular characteristics of the user 120, to avoid components having certain angles or shapes (that might be uncomfortable for a person, that might introduce pressure points, or the like), to account for stresses that components need to be able to handle, to account for imperfections that can arise from the template garment 110 not perfectly fitting the user 120, to account for imperfections that can arise during scanning, to account for areas where the user 120 needs additional support due to a previous injury or surgery, to account for support needs that correspond to a condition of the user 120 (e.g., disease or disorder the user 120 suffers from), or the like.

In some implementations, an administrator can make further adjustments to the modified data model. For example, the administrator can adjust the size of one or more support components in the modified data model, the shape of one or more support components in the modified data model, the size of one or more connector components in the modified data model, the shape of one or more connector components in the modified data model, the number of support components in the modified data model, and/or the number of connector components in the modified data model.

The modified data model can be presented on a display of a user device and/or a display of an administrator device. For example, as shown, the modified data model is presented on an interface 130 of a device. The interface 130 is currently presenting only the components of the modified data model, where each of the shaded areas corresponds with an exosuit component. The dashed lines indicate an outline of the prior or default components. Here, each of the components on the left lower-leg of the user 120 have been reduced in size when compared to the prior or default size of those components.

As shown in FIG. 1, in stage 4, the management system 102 sends the modified data model to a manufacturing device (160). For example, the management system 102 can send the modified data model to a 3D printer 140. As another example, the management system 102 can send the modified data model to a CNC machine, such as a 3-axis, 4-axis, or 5-axis CNC machine.

In some implementations, the management system 102 sends the modified data model to multiple manufacturing devices. For example, the management system 102 can send the modified data model to a first device for manufacturing the exosuit support components (e.g., the 3D printer 140), and to a second device for manufacturing the exosuit connector components (e.g., a CNC machine).

In some implementations, the management system 102 sends different parts of the modified data model to different manufacturing devices. For example, the management system 102 can send a first part of the modified data model having only the exosuit support component data to a first device for manufacturing the exosuit support components (e.g., the 3D printer 140), and a second part of the modified data model having only the exosuit connector component data to a second device for manufacturing the exosuit connector components (e.g., a CNC machine).

Figure 2:
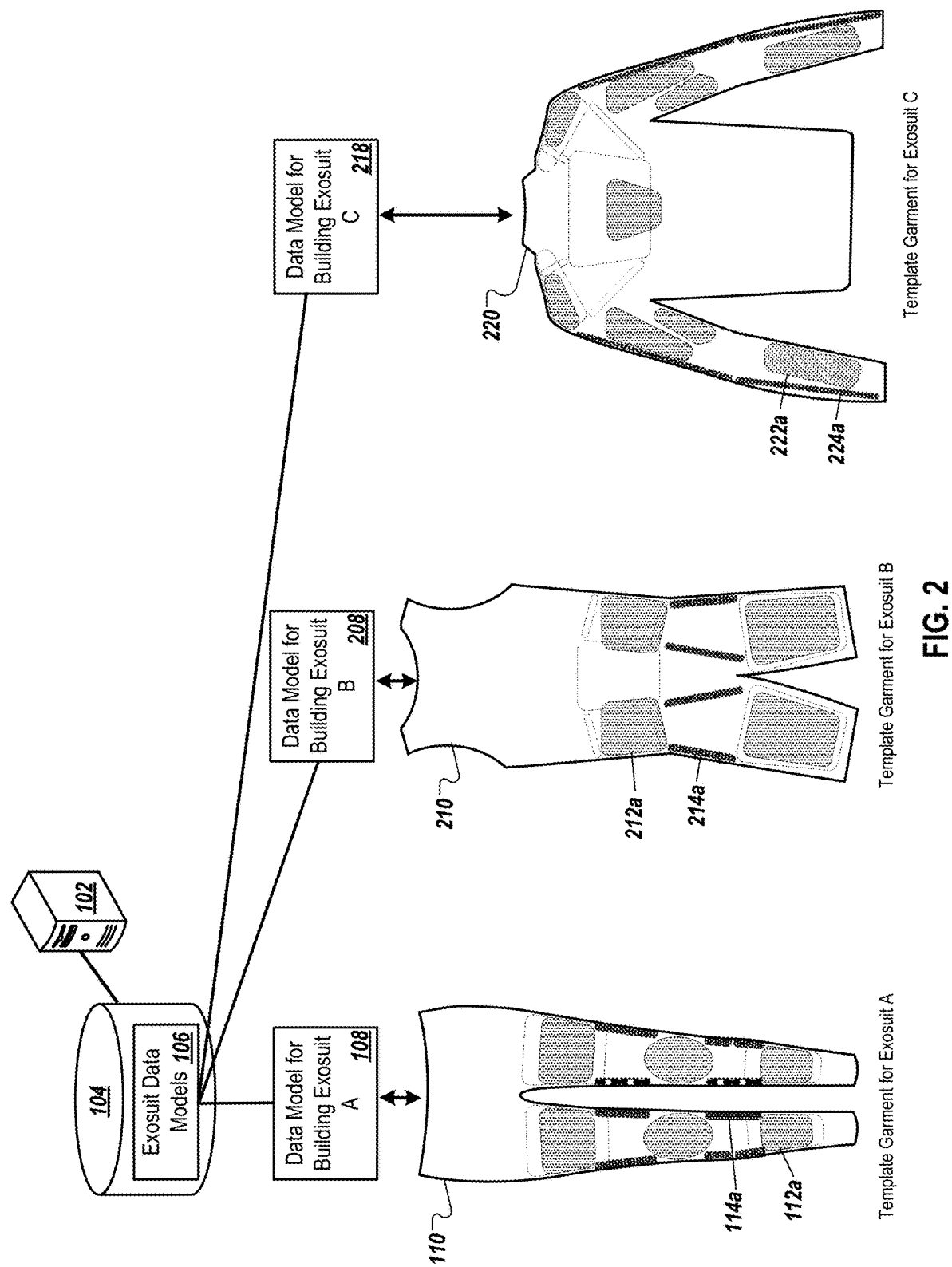
FIG. 2 is a diagram that illustrates example template garments and corresponding data models.

FIG. 2 is a diagram that illustrates example template garments 110, 210, and 230 and corresponding data models 108, 208 and 218. Each of the template garments 110, 210, and 230 can be a stretchable garment that is meant to conform to the anatomy of a person.

Each of the template garments 110, 210, and 230 can correspond to a particular type of exosuit, e.g., an exosuit design, and/or size of exosuit. For example, as shown, the template garment 110 corresponds to the exosuit A, a lower body exosuit. The template garment 110 includes a number of indicators. These indicators include indicators for exosuit components such as the indicator 112a. These indicators also include indicators for exosuit connector components such as the indicator 114a.

As another example, the template garment 210 corresponds to an exosuit "B", a back/hip exosuit. The template garment 210 includes a number of indicators. These indicators include indicators for exosuit components such as the indicator 212a. These indicators also include indicators for exosuit connector components such as the indicator 214a.

As another example, the template garment 220 corresponds to an exosuit "C", an upper body exosuit. The template garment 220 includes a number of indicators. These indicators include indicators for exosuit components such as the indicator 222a. These indicators also include indicators for exosuit connector components such as the indicator 224a.

The template garments 110, 210, and 220 can each have a particular size, e.g., large, medium, or small. The template garment selected from the template garments 110, 210, and 220 can be based on the support that a particular person requires. For example, the template garment 110 can be selected based on a person requiring lower body support. The template garment 210 can be selected based on a person requiring back and/or hip support. The template garment 220 can be selected based on a person requiring upper body support. The template garments can additionally or alternatively be selected based on a required size for the particular person, e.g., based on a height and/or weight of the particular person.

The management system 102 can automatically select one or more of the template garments 110, 210, and 220 based on data for the particular person, e.g., characteristics for the particular person. The data can include received, stored, and/or determined characteristics for the particular person. The data can be stored in the data storage 104. For example, the management system 102 can automatically select the template garments 110, 210, and 220 based on a known height and weight of the user 120, e.g., each of the template garments 110, 210 and 220 can be sized small.

The management system 102 can identify the exosuit corresponding to each of the template garments 110, 210, and 220. For example, the management system 102 can refer to a lookup list that associates the template garments 110, 210, and 220 with particular exosuits and/or types of exosuits. That is, the management system 102 can refer to a lookup list that associates the template garment 110 with the exosuit A, the template garment 210 with the exosuit B, and the template garment 220 with the exosuit C.

The management system 102 can retrieve a data model for each of the identified exosuits from the stored exosuit data models 106. For example, the management system 102 can retrieve the data model 108 for building the exosuit A, the data model 208 for building the exosuit B, and the data model 218 for building the exosuit C. The data models 108, 208, and 218 can each be a default data model for the type and/or size of exosuit corresponding to the template garment 110, 210, and 220, respectively. For example, the data model 218 can be a default data model for an upper body exosuit. As another example, the data model 218 can be a default data model for a small sized upper body exosuit.

In retrieving the data models 108, 208, and 218 for the identified exosuits, the management system 102 can refer to a lookup table, e.g., a lookup up table associating types and/or sizes of exosuits with the exosuit data models 106, to identify the data models 108, 208, and 218. The lookup table can be stored in the data storage 104.

In some implementations, one or more of the data models 108, 208, and 218 are not default data models. For example, the data model 208 can be a data model that was previously personalized for the user 120 or that was previously personalized for a user having similar characteristics to the user 120, e.g., a similar height, weight, age, or the like. Specifically, the user 120 may request a new exosuit after a given period of time, e.g., every six months, every year, every two years, or the like, to account for changes to the user 120's body. The data model 208 retrieved by the management system 102 can be the last data model personalized and/or customized for the user 120.

In some implementations, the template garments 110, 210, and 220 only include indicators for exosuit support components. The management system 102 can automatically adjust the number, size, and/or shape of connector components in the data models 108, 208, and 218 based on a determined size and/or shape of the corresponding support indicators.

In some implementations, the template garments 110, 210, and 220 only includes indicators for exosuit connector components. As will be discussed in more detail below, the management system 102 can automatically adjust the number, size, and/or shape of support components in the data models 108, 208, and 218 based on a determined size and/or shape of the corresponding connector indicators.

Figure 3:
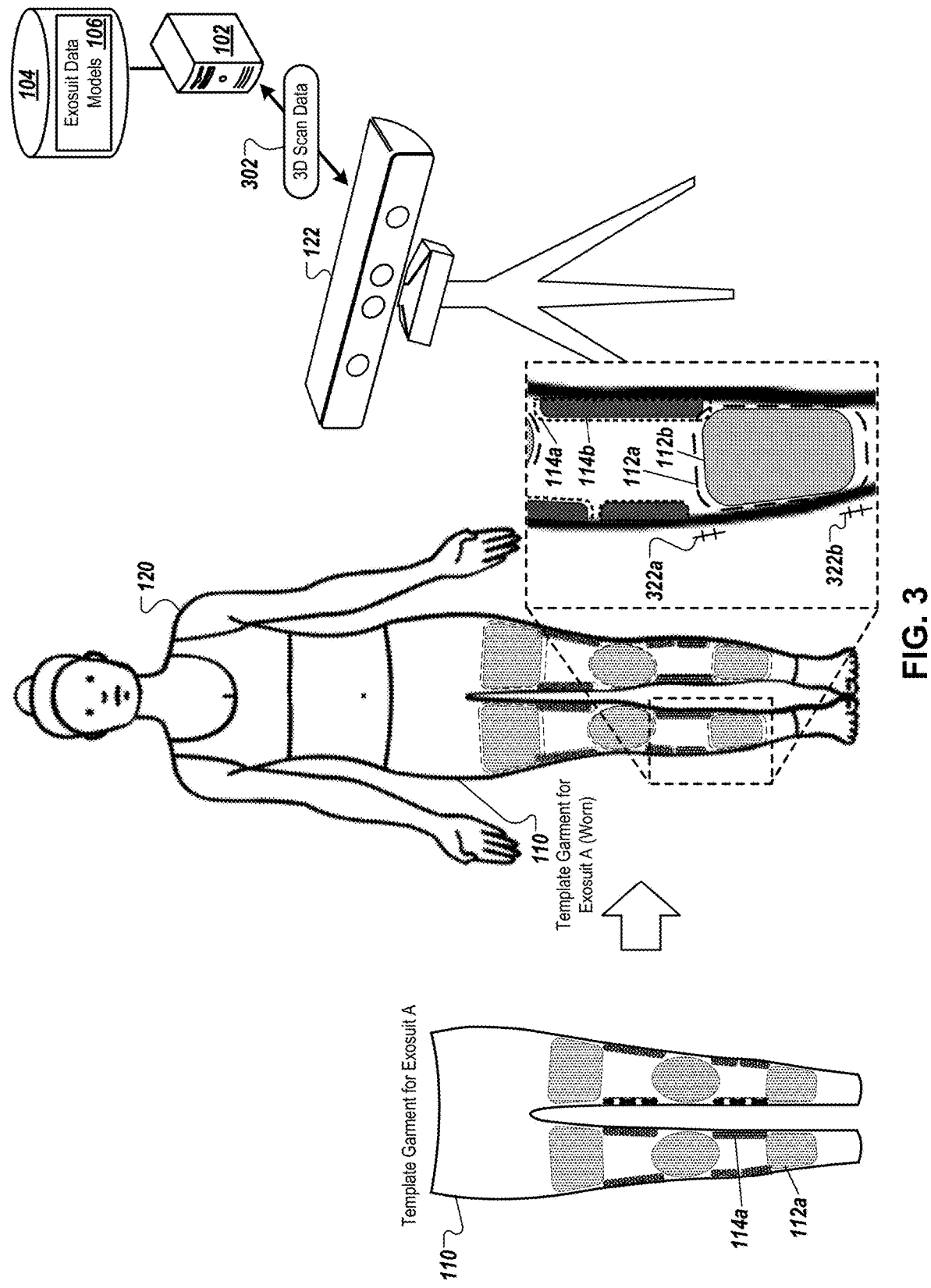
FIG. 3 is an example diagram that illustrates scanning a user wearing a template garment.

FIG. 3 is an example diagram that illustrates scanning the user 120 wearing the template garment 110.

When the user 120 wears the template garment 110, the size and/or shape of one or more indicators can change. For example, the support indicator 112b has been reduced in size. Specifically, the support indicator 112b has been reduced in length by a first distance 322a and a second distance 322b. Similarly, the connector indicator 114b has also been reduced in size. The reduced size of the indicator 112b points out, for example, that the anatomy of the user 120 requires a corresponding exosuit component that is smaller than a default size. Similarly, the reduced size of the indicator 114b points out, for example, that the anatomy of the user 120 requires a corresponding exosuit connector component that is smaller than a default size.

The change in the size and/or shape of one or more component indicators can indicate a similar change needed in the default size and/or shape of one or more corresponding components for an exosuit for the user 120. That is, the change in the size and/or shape of the one or more component indicators can indicate a similar change that the management system 102 needs to make to the one or more corresponding components of the data model 108.

The size and/or shape of the template garment 110's component indicators when the user 120 is wearing the template garment 110 can indicate a size and/or shape of the components for an exosuit for the user 120. That is, the size and/or shape of the template garment 110's component indicators can indicate a size and/or shape of the components in the modified data model.

The 3D scanner 122 is used to scan the user 120 wearing the template garment 110. In scanning the user 120 wearing the template garment 110, the 3D scanner generates 3D scan data 302. The 3D scanner 122 can send the 3D scan data 302 to the management system 102, e.g., over a network. The 3D scan data 302 can include multiple images of the user 120 wearing the template garment 110.

The changes to the shape and/or size of the one or more of the indicators of the template garment 110 can be captured during the scan of the user 120 wearing the template garment 110 by the 3D scanner 122. For example, the scan data can indicate a size and shape of the component indicators including the indicators 112b and 114b.

Figure 4:
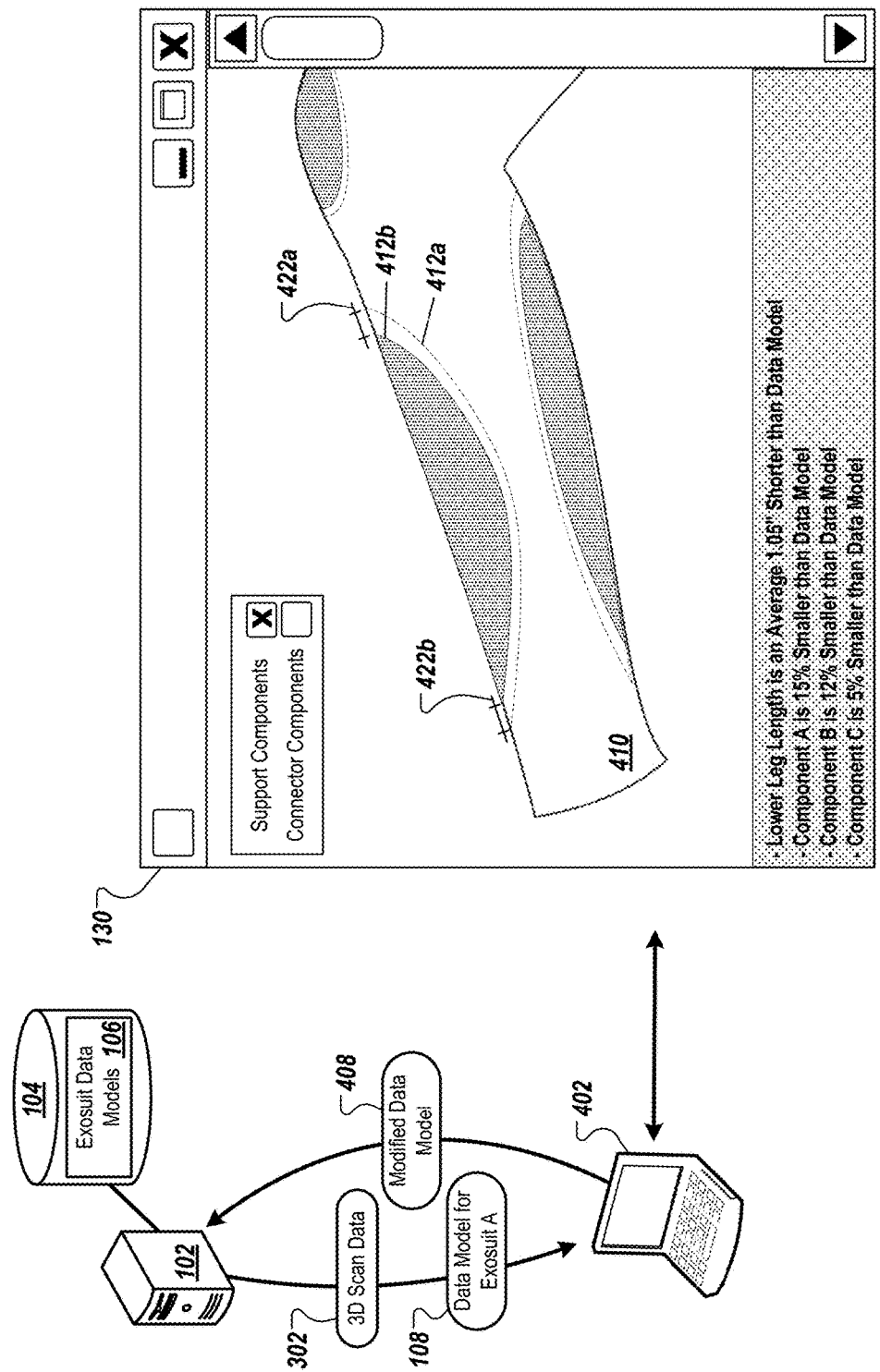
FIG. 4 is an example diagram that illustrates modifying a data model to generate a personalized data model.

FIG. 4 is an example diagram that illustrates modifying the data model 108 to generate a personalized or modified data model 408.

The management system 102 can send the 3D scan data 302 and the data model 108 to an administrator device 402. The administrator device 402 can identify the indicators in the 3D scan of the template garment 110 being worn by the user 120. In identifying the indicators, the administrator device 402 can analyze the images in the 3D scan data 302, e.g., using image recognition, to determine a size, shape, number, type, location, and/or orientation the indicators. As an example, the support indicators, including the indicator 112b, can have a first color, shade, and/or pattern. The connector indicators, including the indicator 114b, can have a second color, shade, and/or pattern that is different than the first color, shade, and/or pattern. The second color, shade, and/or pattern can be selected so as to contrast with the first color, shade, and/or pattern. The first color, shade, and/or pattern and the second color, shade, and/or pattern can be different from a base color, shade, and/or pattern of the template garment 110. The first color, shade, and/or pattern and the second color, shade, and/or pattern can be selected so as to contrast with the base color, shade, and/or pattern of the template garment 110. The administrator device 402 can use the first color, shade, and/or pattern and the second color, shade, and/or pattern of the indicators to, for example, identify the indicators in the 3D scan data 302, identify those indicators that are support indicators, and/or identify those indicators that are connector indicators. In identifying the indicators in the 3D scan data 302, the administrator device 402 can detect a size and/or shape of each of the indicators.

In analyzing the 3D scan data 302, the management system 102 and/or the administrator device 402 can determine for each of the identified indicators at least one of a length of the indicator, a change in length of the indicator with respect to a length of the indicator when the template garment 110 is not worn by the user 120, a width of the indicator, a change in width of the indicator with respect to a width of the indicator when the template garment 110 is not worn by the user 120, an angle of the indicator with respect to one or more of the other indicators, a change in angle of the indicator with respect to an angle of the indicator when the template garment 110 is not worn by the user 120, a distance of the indicator from one or more of the other indicators, or a change in distance of the indicator from one or more of the other indicators with respect to a distance of the indicator from the one or more of the other indicators when the template garment 110 is not worn by the user 120. The management system 102 and/or the administrator device 402 can analyze the identified indicators corresponding to support components with the identified indicators corresponding to connector components. The management system 102 and/or the administrator device 402 can analyze the identified indicators corresponding to support components separately from the identified indicators corresponding to connector components.

The administrator device 402 can also use the 3D scan data 302 to determine characteristics of the user 120. For example, the administrator device 402 can use the 3D scan data 302 to determine a height of the user 120, a right leg length for the user 120, a left leg length for the user 120, a right lower-leg length for the user 120, a left lower-leg length for the user 120, a right upper-leg length for the user 120, a left upper-leg length for the user 120, an estimated body fat percentage for the user, or the like. The administrator device 402 can store the determined characteristics of the user 120, or can send the determined characteristics of the user 120 to the management system 102, e.g., for storage on the data storage 104.

The administrator device 402 can also retrieve or receive characteristics of the user 120. These characteristics can include a height of the user 120, a weight of the user 120, injuries that the user 120 has sustained, surgeries that the user 120 has undergone, diseases that the user 120 suffers from, disorders that the user 120 suffers from (e.g., cerebral palsy), and/or activities that the user 120 intends to perform.

The administrator device 402 can modify the data model 108 using the 3D scan data 302. For example, the management system 102 can modify the data model 108 using the identified indicators. The administrator device 402 can modify the data model 108 based on a detected size and/or shape of the indicators. The administrator device 402 can adjust a default size of one or more support components and/or connector components of the data model 108 using the detected sizes and/or shapes of the indicators. The administrator device 402 can additionally modify the data model 108 using characteristics for the user 120. For example, the administrator device 402 can take into account a determined left leg and right leg length of the user 120 when modifying the data model 108.

In modifying the data model 108, the administrator device 402 can adjust the size of one or more support components in the data model 108, the shape of one or more support components in the data model 108, the size of one or more connector components in the data model 108, the shape of one or more connector components in the data model 108, the number of support components in the data model 108, and/or the number of connector components in the data model 108.

In modifying the data model 108, the administrator device 402 can use one or more algorithms, such as one or more machine learning algorithms. The administrator device 402 can use these one or more algorithms to, for example, identify a type of template garment that the user 120 is wearing based on the 3D scan data 302, to identify a size of template garment that the user 120 is wearing based on the 3D scan data 302, to adjust a size of one or more support components in the data model 108 based on the 3D scan data 302, to adjust a size of one or more connector components in the data model 108 based on the 3D scan data 302, to adjust a number of support components in the data model 108 based on the 3D scan data 302, and/or adjust a number of connector components in the data model 108 based on the 3D scan data 302. The one or more machine learning algorithms can receive the 3D scan data 302 as input. The one or more machine learning algorithms can also receive characteristics of the user 120 as input.

The adjustments made by the one or more algorithms to the components of the data model 108 can be refinements on the detected size and/or shapes of the corresponding indicators. For example, the administrator device 402 can adjust a size and/or shape of a component of the data model 108 using the one or more algorithms based on the 3D scan data 302 and/or the characteristics of the user 120. The resulting component size and/or shape can have a different size and/or shape than the detected size and/or shape of the corresponding component indicator. That is, the one or more algorithms can adjust the size and/or shape of the component to account for other factors, e.g., to account for particular characteristics of the user 120, to avoid components having certain angles or shapes (that might be uncomfortable for a person, that might introduce pressure points, or the like), to account for stresses that components need to be able to handle, to account for imperfections that can arise from the template garment 110 not perfectly fitting the user 120, to account for imperfections that can arise during scanning, to account for areas where the user 120 needs additional support due to a previous injury or surgery, to account for support needs that correspond to a condition of the user 120 (e.g., disease or disorder the user 120 suffers from), or the like.

As a result of these modifications, the administrator device 402 generates a modified data model 408. An administrator using the administrator device 402 can make further adjustments to the modified data model 408. For example, the administrator can adjust the size of one or more support components in the modified data model 408, the shape of one or more support components in the modified data model, the size of one or more connector components in the modified data model, the shape of one or more connector components in the modified data model, the number of support components in the modified data model, and/or the number of connector components in the modified data model.

The modified data model 408 can be presented on a display of the administrator device 402. For example, as shown, the modified data model 408 is presented on an interface 130 of a device. The interface 130 is currently presenting only the components of the modified data model 408, where each of the shaded areas corresponds with an exosuit component. The dashed lines indicate an outline of the prior or default components. Here, each of the components on the left lower-leg of the user 120 have been reduced in size when compared to the prior or default size of those components.

As an example, a first component 412b corresponds to an exosuit shin component. The first component 412b has been personalized for the user 120. Notably, the first component 412b is reduced in size when compared to the size of a default shin component 412a. The first component 412b has a length that is a first distance 422a and a second distance 422b shorter than the default shin component 412a.

The interface 130 can also display information related to the user 120 and/or the modified data model 408. For example, as shown, the interface 130 displays a determined characteristic of the user 120, e.g., determined by the administrator device 402. Specifically, the interface 130 displays a determination that the user 120 has a lower leg length that is 1.05" shorter than the lower leg length for the data model 108. The administrator device 402, e.g., one or more algorithms running on the administrator device 402, can use this determined difference in leg length to update the sizes and/or shapes of the lower leg support and connector components in the data model 108. As another example, the interface 130 displays information related to the modified data model 408. Specifically, the interface 130 displays the determined sizes of support components in the modified data model 408 when compared to their original size in the data model 108, e.g., the first component 412b has been modified by the administrator device to be 15% smaller than the default shin component 412a so that it is personalized for the user 120.

In some implementations, instead of being modified data model 408 being generated by the administrator device 402, the modified data model 408 can be generated by the management system 102 as described above with respect to FIG. 1.

In some implementations, the modified data model 408 is generated by the management system 102 using the 3D scan data 302. The management system 102 can provide the modified data model 408 to the administrator device 402 for review, further adjustments, and/or customizations.

Figure 5:
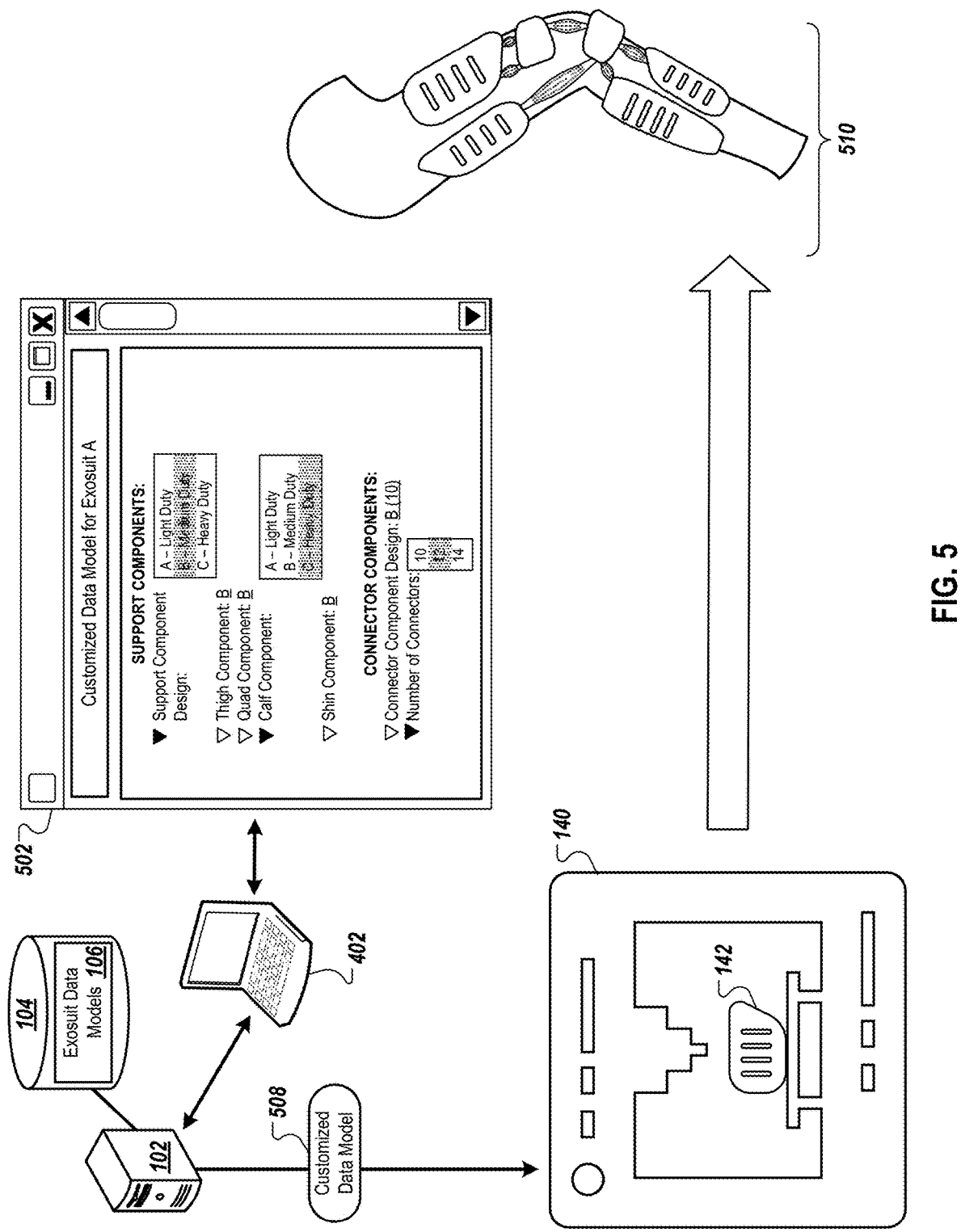
FIG. 5 is an example diagram that illustrates customizing the personalized data model and providing the customized data model to an external device.

FIG. 5 is an example diagram that illustrates customizing the personalized or modified data model 408 and providing the customized data model 508 to an external device.

A customization interface 502 can be presented on the administrator device 402. An administrator using the administrator device 402 can use the customization interface 502 to customize a data model for the user 120, e.g., to customize the modified data model 408 (and/or the data model 108). In customizing the modified data model 408, the administrator can enter or select one or more field values. Some of the fields can correspond to exosuit support components, and others can correspond to exosuit connector components. There can be a field for an overall support component design. For example, an administrator can select from a "A—Light Duty" design, a "B—Medium Duty" design, or a "C—Heavy Duty" design. In addition to an overall support component design, the modified data model 408 can be further customized on a component by component basis. For example, an administrator can select a medium duty support component design but can still proceed to select a heavy duty design for the calf support component, e.g., due to the user 120 needing greater support for their calf and/or lower leg. There can also be a field for the overall connector component design. For example, an administrator can select from a light duty design, a medium duty design, or a heavy duty design. Each of the designs can correspond to a particular number of connectors. The administrator can also proceed to further customize the design by selecting an exact number of connectors to be used for the exosuit, e.g., from a list of permitted connector numbers.

The light duty design can indicate the user 120 requires less than average support, and/or requires a lighter weight exosuit design. The light duty design can indicate a specific or range of design parameters for each of the components of the exosuit, a number of components for the exosuit, a material used to manufacture the components, or the like. For example, the light duty design can include less components than a heavy duty design, and/or the components in the light duty design can be 10-20% thinner than the components in the medium duty design and 20-30% thinner than components in the heavy duty design.

The medium duty design can indicate the user 120 requires average support, and/or requires a medium weight exosuit design. The medium duty design can indicate a specific or range of design parameters for each of the components of the exosuit, a number of components for the exosuit, a material used to manufacture the components, or the like.

The heavy duty design can indicate the user 120 requires greater than average support, and/or can handle or requires a heavy weight exosuit design. The heavy duty design can indicate a specific or range of design parameters for each of the components of the exosuit, a number of components for the exosuit, a material used to manufacture the components, or the like.

Various fields shown in the customization interface 502 can be automatically, e.g., without administrator input, filled in by the administrator device 402, and/or have a default value. For example, a default value for each of the fields can be the medium duty value. The administrator device 402 can automatically fill in one or more of the fields based on characteristics of the user 120. For example, the characteristics of the user 120 can include a weight of the user 120, an activity level of the user 120, an age of the user 120, injuries suffered by the user 120, surgeries that the user 120 has had, diseases that the user 120 suffers from, disorders that the user 120 suffers from (e.g., cerebral palsy), and/or an intended use of the exosuit by user 120. The administrator device 402 can use one or more of these characteristics to fill in one or more of the fields in the customization interface 502, e.g., without administrator input.

As an example, the characteristics of the user 120 can indicate that the user 120 has above average weight and has a moderate activity level. The administrator device 402 can use these two characteristics to select "Medium Duty" for the component design, e.g., without input from an administrator. The characteristics of the user 120 can also indicate that the user recently suffered a calf injury. The administrator device 402 can use this characteristics to select "Heavy Duty" for the component design to provide the user 120 more support for their injured calf, e.g., without input from an administrator.

The administrator can override the fields in the customization interface 502 that were automatically filled in or that were filled in with default values.

In some implementations, the administrator device 402 receives the modified data model 408 shown in FIG. 4 from the management system 102. An administrator can then use the administrator device 402 to customize the modified data model 408, resulting in the customized data model 508.

In some implementations, a user device of the user 120 receives the modified data model 408 shown in FIG. 4 from the management system 102. The user 120 can then use administrator device 402 is then used to customize the modified data model 408, resulting in the customized data model 508.

In some implementations, the customized data model 508 is generated by the management system 102. For example, the management system 102 can customize the modified data model 408 shown in FIG. 4, e.g., without manual input, using characteristics of the user 120.

In some implementations, the modified data model 408 shown in FIG. 4 is sent to the external device with customizations. For example, the management system 102 can send the modified data model 408 to the 3D printer 140.

The management system 102 sends the customized data model 508 to a manufacturing device. For example, the management system 102 can send the modified data model to the 3D printer 140. As another example, the management system 102 can send the customized data model 508 to a CNC machine, such as a 3-axis, 4-axis, or 5-axis CNC machine.

As shown, once the 3D printer 140 receives the customized data model 508, it starts to print components for an exosuit 510. The 3D printer 140 has completed printing a number of components for the exosuit 510 including the component 142.

The printed components can be assembled to form the exosuit 510. The exosuit 510 can be, for example, a powered exoskeleton, a hydraulic exoskeleton, a pneumatic exoskeleton, or powered mechanized clothing. Where the exosuit 510 is mechanized clothing, an additional covering, e.g., a cloth covering, can be used to cover the components that make up the exosuit 510. Alternatively, where the exosuit 510 is mechanized clothing, generating the exosuit 510 can include manufacturing a pair of pants having specialized compartments and/or pockets that are designed to receive the support components and/or connector components of the exosuit 510. The pair of pants can have a default design such the compartments and/or pockets are designed to fit a wide-range of component sizes and/or shapes. Alternatively, the pair of pants can be semi-customized for the user 120 based on the modified data model 408 or the customized data model 508. That is, there can be multiple pre-designed pairs of pants that correspond to the exosuit A. A particular pair of pants can be selected from the multiple pre-designed pairs of pants based on a size and/or shape of support components and/or connector components in the modified data model 408 or the customized data model 508. Alternatively, the pair of pants can be customized for the user 120 based on the modified data model 408 or the customized data model 508. For example, the size and/or shapes of the compartments and/or pockets to receive components can be customized based on the modified data model 408 or the customized data model 508, e.g., so that each of the compartments/pockets have a size and/or shape such that there is snug fit when they receive a corresponding component.

In some implementations, the management system 102 sends the customized data model 508 to multiple manufacturing devices. For example, the management system 102 can send the customized data model 508 to a first device for manufacturing the exosuit support components (e.g., the 3D printer 140), and to a second device for manufacturing the exosuit connector components (e.g., a CNC machine).

In some implementations, the management system 102 sends different parts of the customized data model 508 to different manufacturing devices. For example, the management system 102 can send a first part of the customized data model 508 having only the exosuit support component data to a first device for manufacturing the exosuit support components (e.g., the 3D printer 140), and a second part of the customized data model 508 having only the exosuit connector component data to a second device for manufacturing the exosuit connector components (e.g., a CNC machine).

Figure 6:
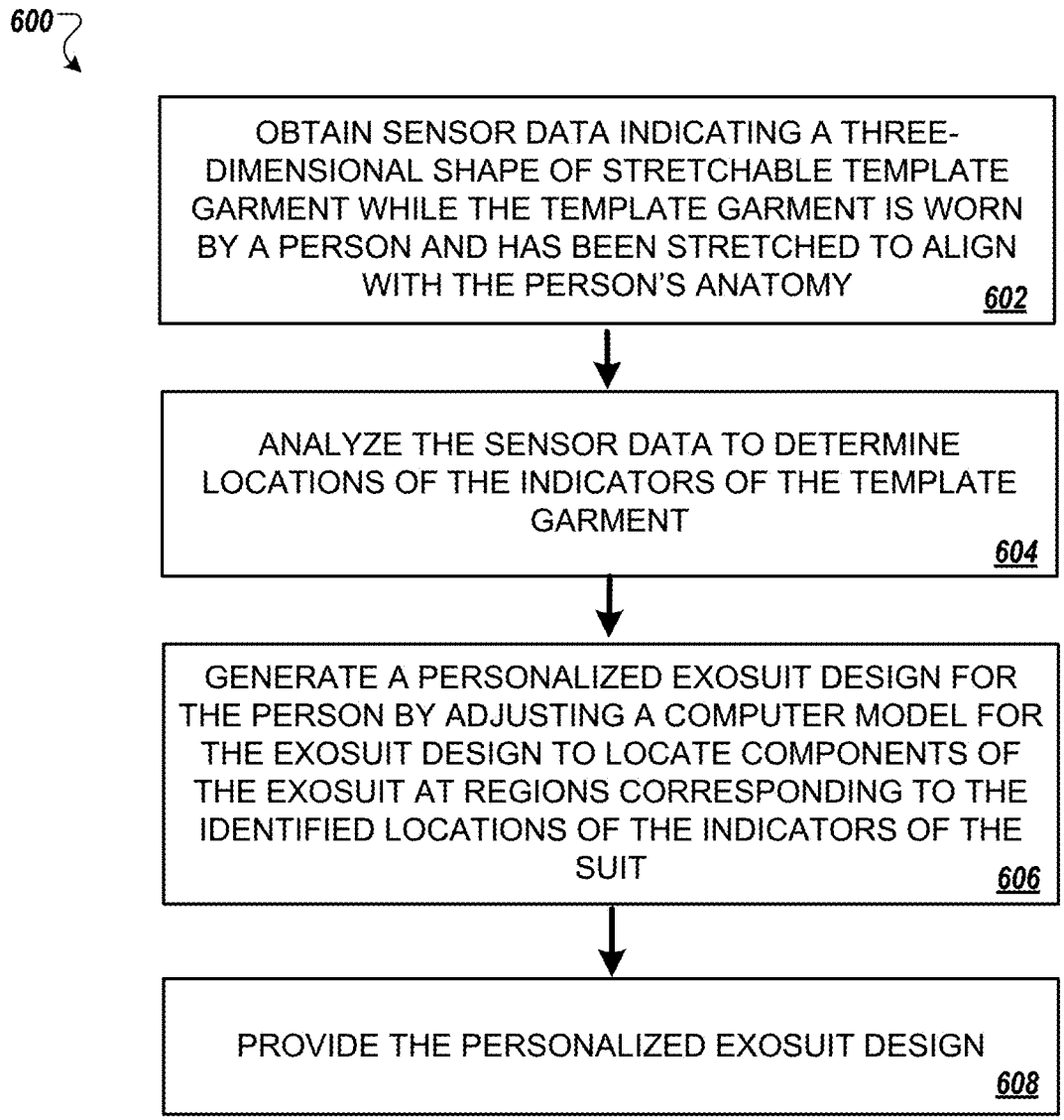
FIG. 6 is an example process for generating personalized exosuits.

FIG. 6 is an example process for generating personalized exosuits. The process 600 can be performed, at least in part, using the system 100 described herein.

The process 600 includes obtaining sensor data indicating a three-dimensional shape of stretchable template garment while the template garment is worn by a person and has been stretched to align with the person's anatomy (602). The template garment can correspond to a particular exosuit design or particular type of exosuit. For example, the template garment can correspond to a type of exosuit that provides a particular kind of support, such as right leg support, left leg support, lower body support, hip and/or back support, upper body support, right arm support, left arm support, or the like. The template garment can be selected for the person based on the type of support the person needs and/or the characteristics of the person. For example, if the person has cerebral palsy, a template garment corresponding to a lower body exosuit can be selected. The template garment can correspond to a particular sized exosuit, e.g., a large size, medium size, or small size. For example, the template garment can correspond to a large sized upper body exosuit. The template garment can be further selected for having a particular size that will fit the person. For example, the template garment can be selected based on a height, weight, and/or clothing size of the person. As an example, the stretchable template garment can be the template garment 110, 210, or 220 shown in FIGS. 1-2.

The sensor data can include 3D scan data. The 3D scan data can include multiple images of the person wearing the stretchable template garment. The 3D scan data can include multiple images of the person wearing the stretchable template garment in different orientations and/or taken from different angles with respect to the person.

The process 600 includes analyzing the sensor data to determine locations of the indicators of the template garment (604). The template garment can include a number of indicators. These indicators can correspond to support components and/or connector components of an exosuit design or a type of exosuit, e.g., an exosuit design or type of exosuit that corresponds to the template garment. As an example, the support indicators can have a first color, shade, and/or pattern. The connector indicators can have a second color, shade, and/or pattern that is different than the first color, shade, and/or pattern. The second color, shade, and/or pattern can be selected so as to contrast with the first color, shade, and/or pattern. The first color, shade, and/or pattern and the second color, shade, and/or pattern can be different from a base color, shade, and/or pattern of the template garment 110. The first color, shade, and/or pattern and the second color, shade, and/or pattern can be selected so as to contrast with the base color, shade, and/or pattern of the template garment 110. The management system 102 shown in FIGS. 1-5 can use the first color, shade, and/or pattern and the second color to identify the indicators in the sensor data, identify the support indicators, and/or identify the connector indicators. Having identified the indicators, the management system 102 can then determine a size and/or shape of each of the indicators. In some cases, the template garment only includes support indicators. In some cases, the template garment only includes connector indicators.

In some cases, analyzing the sensor data includes providing the sensor data to one or more models or algorithms. These models include one or more machine learning models. These algorithms can include one or more machine learning algorithms.

The process 600 includes generating a personalized exosuit design for the person by adjusting a computer model for the exosuit design to locate components of the exosuit at regions corresponding to the identified locations of the indicators of the suit (606). The personalized exosuit design can be generated from a previous or default computer model for an exosuit corresponding to the stretchable template garment. The computer model can be a 3D computer model. The computer model can be modified using the sensor data. The computer model can be further modified based on characteristics of the person. As an example, the management system 102 shown in FIGS. 1-5 can generate a modified computer model that serves as a personalized exosuit design using the sensor data. The management system 102 can use image recognition to identify the indicators in the sensor data, identify the support indicators, and/or identify the connector indicators. For example, the management system 102 can use the first color, shade, and/or pattern and the second color to identify the indicators in the sensor data, identify the support indicators, and/or identify the connector indicators.

In some cases, the modified computer model is further adjusted. For example, the modified computer model can be customized, e.g., automatically without input or by an administrator using an administrator device. The modified computer model can be customized to, for example, provide overall increased support, provide overall less support, provide increased support in one or more areas, provide less support in one or more areas, reduce overall weight (e.g., through selection of a different material to use in support and/or connector component manufacture, through selection of a thinner support and/or connector component design, selection of a smaller support and/or connector component design, through removal of one or more support components, and/or through removal of one or more connector components), reduce weight as to a specific component or area of support, increase overall structural support (e.g., through selection of a different material to use in support and/or connector component manufacture, through selection of a thicker support and/or connector component design, selection of a larger support and/or connector component design, through an addition of one or more support components, and/or through an addition of one or more connector components), increase structural support as to a specific component or area, or the like. This customized computer model can serve as the personalized exosuit design.

The process 600 includes providing the personalized exosuit design (608). Providing the personalized exosuit design can include providing the personalized exosuit design to one or more external manufacturing devices, such as a 3D printer and/or a CNC machine. For example, the management system 102 can send the personalized exosuit design to a 3D printer. The 3D printer can use the personalized exosuit design to manufacture each of the components represented in the personalized exosuit design. The printed components can be assembled to form a personalized exosuit for the person.

In some cases, the management system 102 sends the personalized exosuit design to multiple manufacturing devices. For example, the management system 102 can send the personalized exosuit design to a first device for manufacturing the exosuit support components (e.g., the 3D printer 140), and to a second device for manufacturing the exosuit connector components (e.g., a CNC machine).

In some implementations, the management system 102 sends different parts of the modified data model to different manufacturing devices. For example, the management system 102 can send a first part of the personalized exosuit design having only the exosuit support component data to a first device for manufacturing the exosuit support components (e.g., the 3D printer 140), and a second part of the personalized exosuit design having only the exosuit connector component data to a second device for manufacturing the exosuit connector components (e.g., a CNC machine).

A module (also known as a program, software, software application, script, or code) may be written in any form of programming language, including compiled or interpreted languages, and it may be deployed in any form, including as a stand-alone program or as a module, component, subroutine, or other unit suitable for use in a computing environment. A module does not necessarily correspond to a file in a file system. A module may be stored in a portion of a file that holds other programs or data (e.g., one or more scripts stored in a markup language document), in a single file dedicated to the program in question, or in multiple coordinated files (e.g., files that store one or more modules, sub programs, or portions of code). A module may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a module include, by way of example, both general and special purpose microprocessors, and one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
    obtaining, by the one or more computers, sensor data indicating a three-dimensional shape of stretchable template garment measured while the template garment is worn by a person and has been stretched to align with the person's anatomy, wherein the template garment includes indicators for exosuit components of an exosuit design for an exosuit configured to apply or adjust force at an anatomical structure of a wearer of the exosuit, and wherein the indicators of the template garment are located such that, when the template garment is worn by the person in alignment with the person's anatomy, the indicators designate locations for the exosuit components of the exosuit design to be placed with respect to the person's anatomy;
    analyzing, by the one or more computers, the sensor data to determine locations where the indicators of the template garment were located while the template garment was worn by the person in alignment with the person's anatomy;
    generating, by the one or more computers, a personalized exosuit design for the person by adjusting a data model for the exosuit design, wherein the adjustment places the exosuit components at regions determined based on the locations of the indicators of the template garment determined by analysis of the sensor data; and
    providing, by the one or more computers, the personalized exosuit design to a device.

2. The method of claim 1, wherein the data model is a data model representing a reference design for an exosuit.

3. The method of claim 1, wherein the data model is a computer-aided design model that specifies positional relationships of exosuit components in three dimensions.

4. The method of claim 1, wherein the indicators are visible at an outer surface of the template garment.

5. The method of claim 1, wherein obtaining the sensor data comprises obtaining sensor data for multiple different poses of the person while the template garment is worn by the person.

6. The method of claim 5, further comprising using the sensor data for the multiple different poses to determine at least one of:
    anatomical properties of the person;
    positions of exosuit components of the personalized exosuit design; or
    functional capabilities for the personalized exosuit design.

7. The method of claim 6, wherein the functional capabilities include at least one of a range of motion for the personalized exosuit design, a joint center of motion for the personalized exosuit design, a level of assistance for the personalized exosuit design to provide, a level of stability for the personalized exosuit design to provide, or a set of functionality configured to assist with a particular health condition.

8. The method of claim 1, wherein analyzing the sensor data comprises analyzing the sensor data to determine at least one of a size, shape, number, type, or orientation of the indicators of the template garment.

9. The method of claim 1, wherein generating the personalized exosuit design comprises adjusting at least one of a size, shape, number, type, location, or orientation of one or more exosuit components.

10. The method of claim 1, wherein providing the personalized exosuit design to the device comprises providing the personalized exosuit design to a manufacturing device.

11. The method of claim 10, wherein providing the personalized exosuit design to a manufacturing device comprises providing the personalized exosuit design to a 3D printer.

12. The method of claim 10, wherein providing the personalized exosuit design to a manufacturing device comprises providing the personalized exosuit design to a computer numerical control (CNC) machine.

13. The method of claim 1, further comprising receiving input indicating modifications to at least one of a size, shape, number, type, location, or orientation of the components of the exosuit; and wherein generating a personalized exosuit design comprises adjusting the data model for the exosuit design or the personalized exosuit design in accord with the modifications.

14. The method of claim 1, wherein obtaining sensor data comprises obtaining scan data from a 3D scanner.

15. The method of claim 14, wherein obtaining scan data from the 3D scanner comprises obtaining scan data from one of the following:
a photogrammetry scanner;
a LiDAR scanner; or
a structured light scanner.

16. The method of claim 1, wherein the template garment is one of multiple template garments, each of the template garments having indicators for exosuit components of a different exosuit design;
wherein the method comprises selecting, from among data models for the different exosuit designs, a data model for the exosuit design that is determined to correspond to the template garment worn by the person; and
wherein generating the personalized exosuit design for the person comprises altering the selected data model based on the locations of the indicators of the template garment.

17. The method of claim 1, wherein the template garment includes indicators for exosuit components of multiple exosuit designs, and wherein the method comprises selecting the exosuit design from the multiple exosuit designs.

18. The method of claim 17, comprising determining one or more functional capabilities to be provided by an exosuit for the person,
wherein selecting the exosuit design comprises selecting the exosuit design for the exosuit design from the multiple exosuit designs based on the determined one or more functional.

19. A system comprising:
one or more computers; and
one or more computer-readable media storing instructions that, when executed, cause the one or more computers to perform operations comprising:
obtaining, by the one or more computers, sensor data indicating a three-dimensional shape of stretchable template garment measured while the template garment is worn by a person and has been stretched to align with the person's anatomy, wherein the template garment includes indicators for exosuit components of an exosuit design for an exosuit configured to apply or adjust force at an anatomical structure of a wearer of the exosuit, and wherein the indicators of the template garment are located such that, when the template garment is worn by the person in alignment with the person's anatomy, the indicators designate locations for the exosuit components of the exosuit design to be placed with respect to the person's anatomy;
analyzing, by the one or more computers, the sensor data to determine locations where the indicators of the template garment were located while the template garment was worn by the person in alignment with the person's anatomy;
generating, by the one or more computers, a personalized exosuit design for the person by adjusting a data model for the exosuit design, wherein the adjustment places the exosuit components at regions determined based on the locations of the indicators of the template garment determined by analysis of the sensor data; and
providing, by the one or more computers, the personalized exosuit design to a device.

20. One or more non-transitory computer-readable media storing instructions that, when executed by one or more computers, cause the one or more computers to perform operations comprising:
obtaining, by the one or more computers, sensor data indicating a three-dimensional shape of stretchable template garment measured while the template garment is worn by a person and has been stretched to align with the person's anatomy, wherein the template garment includes indicators for exosuit components of an exosuit design for an exosuit configured to apply or adjust force at an anatomical structure of a wearer of the exosuit, and wherein the indicators of the template garment are located such that, when the template garment is worn by the person in alignment with the person's anatomy, the indicators designate locations for the exosuit components of the exosuit design to be placed with respect to the person's anatomy;
analyzing, by the one or more computers, the sensor data to determine locations where the indicators of the template garment were located while the template garment was worn by the person in alignment with the person's anatomy;
generating, by the one or more computers, a personalized exosuit design for the person by adjusting a data model for the exosuit design, wherein the adjustment places the exosuit components at regions determined based on the locations of the indicators of the template garment determined by analysis of the sensor data; and
providing, by the one or more computers, the personalized exosuit design to a device.

* * * * *